United States Patent [19]

Friedewald

[11] Patent Number: 4,544,010

[45] Date of Patent: Oct. 1, 1985

[54] TIRE AND ANTISKID NET FOR VEHICLE TIRES

[75] Inventor: Günter Friedewald, Warstein, Fed. Rep. of Germany

[73] Assignee: Siepmann-Werke GmbH & Co. KG, Warstein, Fed. Rep. of Germany

[21] Appl. No.: 532,444

[22] Filed: Sep. 14, 1983

[30] Foreign Application Priority Data

Sep. 14, 1982 [DE] Fed. Rep. of Germany ....... 3234028

[51] Int. Cl.$^4$ ............................................. B60C 27/00
[52] U.S. Cl. ............................... 152/231; 24/20 EE; 24/69 TT; 152/243; 152/244; 301/42; 403/344
[58] Field of Search ................................ 152/231–244, 152/213 R, 213 A, 223, 224, 167, 169, 170, 171, 172, 217, 218, 219, 220; 301/42; 403/344; 24/277, 279, 116 A, 116 R, 241 PS, 23 W, 27, 3 K, 69 TT, 20 EE; 70/459, 456 R

[56] References Cited

U.S. PATENT DOCUMENTS

| | | | |
|---|---|---|---|
| 1,855,279 | 4/1932 | Borg | 152/239 |
| 2,580,396 | 1/1952 | Bluth | 24/279 X |
| 3,871,431 | 3/1975 | Dohmeier | 152/243 |
| 3,952,382 | 4/1976 | Vaage | 24/241 PS |
| 4,106,542 | 8/1978 | Dohmeier | 152/239 |

Primary Examiner—Edward Kimlin
Assistant Examiner—Thomas Bokan
Attorney, Agent, or Firm—Michael J. Striker

[57] ABSTRACT

A tire and antiskid net for vehicle tires, particularly for tires of heavy earth moving machines, has a plurality of vertical members arranged to extend substantially normally to a tire surface, a plurality of ring-shaped connecting members of a limited length engaging the vertical members and arranged to extend substantially parallel to the tire surface, and a plurality of sleeve-shaped closure members fitted onto the ends of each connecting member in their abutting position so as to hold together the abutting ends of each of the connecting members.

13 Claims, 32 Drawing Figures

TIRE AND ANTISKID NET FOR VEHICLE TIRES

BACKGROUND OF THE INVENTION

The present invention relates to a tire and antiskid net for vehicle tires, particularly for tires of heavy earth moving machines. It also relates to a method of manufacturing a tire and antiskid net, particularly for tires of heavy earth moving machines.

Tires and antiskid nets of this type are known in the art and disclosed for example in the DE-OS No. 2,706,621. During manufacturing of these nets, the vertical members are suspended in the opened connecting rings, and thereafter the connecting rings are closed by welding. It is desirable that the connecting members on the one hand and the vertical members on the one hand be made of material which corresponds to their specific functions. The vertical members must be especially wear-resistant, whereas the connecting members, because of the repetitive stresses, must be elastic and at the same time must also possess a sufficient wear-resistance. This condition requires a special heat treatment for the different members. It is theoretically recommended to provide in the known chains with respect to their vertical members on the one hand and the connecting members on the other hand different heat treatments after the mounting. This, however, requires a very high expense. As a result of this in practice heat treatment prior to the mounting has been accepted. However, in this case there is the disadvantage that during welding of the connecting members after the mounting the special properties are affected. Additional post-treatment is therefore necessary.

Basically, it is conceivable that in a tire and antiskid net of the above mentioned type the connecting members are left open. However, such connecting members, when they have unreasonably great cross sections, do not withstand high loads during their use, so that the net is slightly damaged. Also, the connecting members in such tire and antiskid nets can be kept closed by mechanical auxiliary means, for example by connecting brackets and screws, as disclosed for example in the DE-AS No. 2,061,395 for closure and repair members. Such a solution is, however, uneconomical and moreover is disadvantageous in a technical sense The closure members described in the DE-AS No. 2,061,395 are ring-shaped and have two radially outwardly bent ends which engage in two openings of a closure plate mounted with the aid of screws and a countersupport engageable in the interior of the ring. This arrangement occupies so much space that only a small number of the vertical members can be suspended in the connecting ring, even when the diameter of the connecting ring is selected very large.

SUMMARY OF THE INVENTION

It is an object of the present invention to provide a tire and antiskid net for vehicle tires, particularly for tires of heavy earth moving machines, which avoid the disadvantages of the prior art.

More particularly, it is an object of the present invention to provide a tire and antiskid net which allows, without welding and disadvantageous thermal post-treatment, to assemble a net ready for mounting, wherein the connecting members have practically no limits as to the number of vertical members to be suspended thereon.

It is a further object of the present invention to provide a method of manufacturing such a tire and antiskid net which is improved as compared with the known methods.

In keeping with these objects and with others which will become apparent hereinafter one feature of the present invention resides, briefly stated, in a tire and antiskid net in which two ends of each of the connecting members, the ends abutting against one another, are held together by a sleeve-like closure member.

Another feature of the present invention is a method of manufacturing of a tire and antiskid chain, in accordance with which a plurality of connecting members are provided, a plurality of vertical members are introduced in each of the connecting members, the ends of each of the connecting members are bent until they abut against one another, and a sleeve-shaped closure member is fitted onto the ends of each of the connecting members.

The inlet openings are advantageously selected with such a dimension that the vertical members can be conveniently suspended. Bending of the ends of each of the connecting members takes place advantageously with the aid of an arrangement which has a countersupport for the opposite portions of both ends of the respective connecting member, and pressure pins engage in substantially laterally the connecting member. For compressing the ends of the connecting members, a cold deformation of the hardened wear-resistant connecting members can be performed. Until now, it was presumed that such a cold deformation of the hardened connecting members leads to destruction of the structural elements. It has been shown that the deformation of the connecting members can be non-damaging when special suitable steel is selected and a respective thermal treatment is provided. Experiments have shown that in the connecting members closed in accordance with the present invention very high pulling forces can be taken. These pulling forces applied in the experiments are considerably higher than the forces expected during operation.

Before the suspension of the vertical members, the connecting members assume a shape in which the ends of the connecting member extend in alignment with one another or offset from one another, wherein the ends are turned from the central plane of the connecting member. Also, a combination of these features is possible, so that an inlet opening extending somewhat diagonal to the central plane of the connecting members are formed. In accordance with a further feature of the inventive method, formation of the inlet openings can take place by spreading apart and/or bending the ends of the connecting members from their planes. With this feature, the material during bending of the ends of the connecting members is only a little loaded.

The connecting members can be profiled so as to be round, oval or edged. Preferred materials for the vertical members are wear-resistant steels, for example tool steel or carburizing steel, whereas for the connecting members formed as connecting rings advantageously hardened and wear-resistant spring steel is used. The formation of the connecting members as connecting rings is advantageous, inasmuch as in this case the position of the vertical members can be easily changed.

The mutually abutting ends of the connecting members are held together by the sleeve-like closure elements. Because of the closure sleeves, each thermal treatment of the net members after the mounting is avoided The net members can be provided as a result of this with exact respective treatment before the mounting, which guarantees during their practical use desired specific properties. In this case the vertical members can be especially wear-resistant, whereas the connecting members can be formed both wear-resistant and also provided with the elasticity required in condition of repetitive loads which take place during their practical use.

In accordance with a further embodiment of the invention, the ends of each of the connecting rings are radially bent in a leg-like manner so as to form two legs abutting against one another, and the closure sleeves are seated on both legs abutting against one another. The legs can be bent radially inwardly. However, in the sense of easy manufacturing of the tire and antiskid net, and also the movement freedom of the vertical members, it is advantageous when the ends of the connecting rings are bent radially outwardly. After the suspension of the vertical members, both ends of each of the connecting rings are pressed together, so that the closure sleeves are fitted without difficulties.

The closure sleeves, composed for example of heat-treatable steel, hold together both ends of each of the connecting rings. In the event of high loads, the legs of the connecting rings can eventually be withdrawn from the closure sleeve. Conditional to the spring force acting in the spring ring and pressing the legs against the opposite inner wall of the closure sleeve, the closure sleeves provide firm holding on the connecting rings. A deformation of the closure sleeves is excluded especially when the connecting rings are formed with for example circular cross section (round steel) and the legs at their abutting sides are flat. Here the entire cross section of the closure sleeve is filled by the legs of the connecting ring.

In accordance with the present invention it is advantageous when the closure sleeves are brought onto the ends of the members by shrinkage.

Despite the firm fit of the closure sleeves on the legs of the connecting rings, it is possible that when for example rock pieces are displaced by the legs the connecting rings are pulled from one another under the action of high loads and the net connecting is destroyed.

For guaranteeing even in this special case that the closure sleeves fit firmly on the legs, the closure sleeve is provided with holding tongues engaging from outside the connecting ring and fixable in the region of the leg abutment. The fixation can be performed such that the holding tongues are bent in a tongs-like manner in direction of the ring central plane with support on the connecting rings, or safety pins are introduced through the oppositely located holding tongues. Experiments have shown that in the event of extreme pulling loads of the connecting rings, the legs have a tendency to be pulled out of the closure sleeves and the legs displace relative to one another. In this condition not both legs simultaneously are released from the closure sleeve, but instead one or the other leg springs. For preventing this phenomenon, the present invention provides on the legs of each of the connecting rings groove-shaped or spline-shaped projections and recesses engaging in one another and arranged so that their separation joints extend normal to the ring central plane. When the connecting rings are designed in accordance with these features, the legs cannot slide relative to one another, and one of the legs cannot spring out of the closure sleeve. For sliding out of the legs from the closure sleeve, a required force must be so high that the connecting ring has to be torn apart before this.

Alternatively or additionally to the above described groove and spline-shaped safety profiling, it is also possible to provide such a construction in which the legs at their opposite sides have symmetrical recesses which surround safety sleeves or safety pins. These safety sleeves or safety pins can be dimensioned so that they at most correspond to the inner width of the closure sleeves. In other words, the closures sleeves are fitted over the legs including the safety pins, or the safety sleeves or the safety pins can extend both through the closure sleeves and through both recesses in the legs. Thereby additionally to the opposite fixation of the legs, also a fixation of the closure sleeves is provided.

Alternatively to the above described solution with radially bent ends of the connecting rings, it is advantageous in accordance with the present invention when the circumferentially extending ends of the connecting members engage in a mirror-symmetrical manner in one another, and the closure sleeves are fitted over the engagement region with a curvature corresponding to the curvature of the connecting members. The engagement region of the ends of the connecting rings correspond for example to zig-zag curves extending inclined to the ring central line.

Pure bending of the ring ends, the curved closure sleeve after suspension of the vertical members is fitted onto one ring end so as to displace after bending of the ring ends over the engagement region. The total pulling forces are then taken in the engagement region, and the closure sleeves have the purpose of preventing release of the engagement by opposite rotation or displacement of the ends of the connecting ring.

The novel features which are considered characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

DESCRIPTION OF THE PREFERRED EMBODIMENTS

Figure 1:
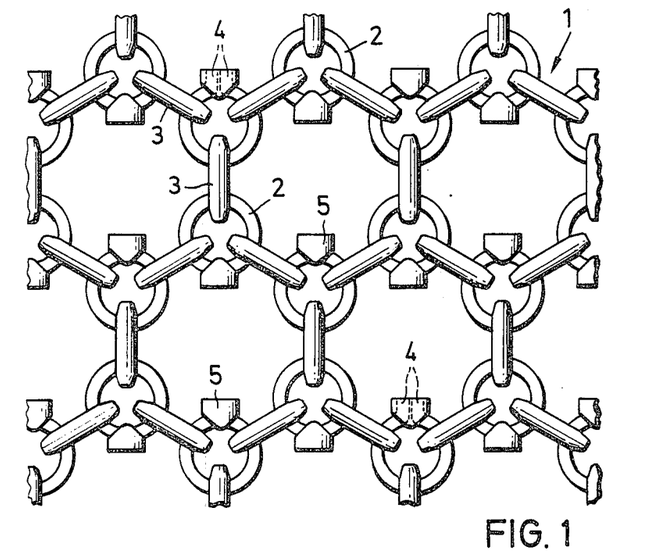
FIGS. 1 and 2 are views showing a portion of a tire and antiskid net in a hexagonal and a quadrangular mesh form.

FIG. 1 shows a portion of a tire and antiskid net 1 for not shown tires of earth moving machines in a hexagonal mesh form. This form is provided so that three vertical members 3 are suspended in each connecting ring 2 which is arranged substantially parallel to a tire surface, wherein the vertical members 3 extend substantially normal to the tire surface. The vertical members 3 are formed as structural elements composed of tool steel and provided with wear profiles on the upper side and the lower side They have the shape of an oval or a FIG. 8. The connecting rings 2 are composed of hardened and wear-resistant spring steel and have two radially outwardly bent legs 4 which are held together by sleeve-shaped closure elements 5, as will be explained hereinbelow.

Figure 2:
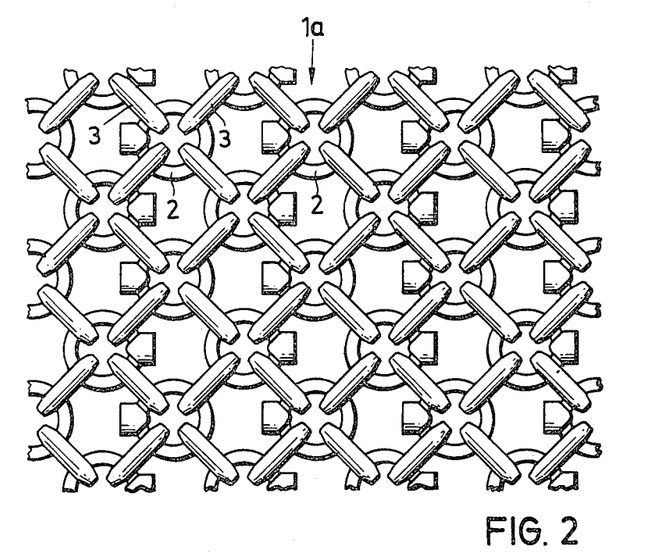

FIG. 2 shows a portion of a tire and antiskid net 1a in a quadrangular mesh form. Here the same parts are used as in the embodiment of FIG. 1. The quadrangular mesh form is provided so that four vertical members 3 are suspended in one connecting ring 2.

Figures 3, 4:
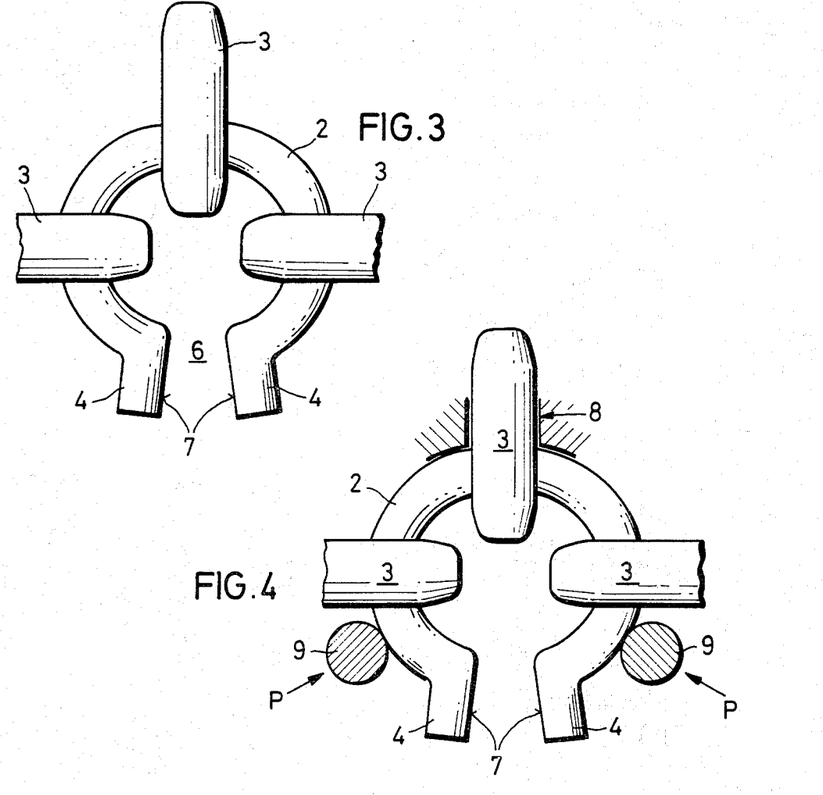
FIG. 3 is a view showing an open connecting ring of the inventive net with three suspended vertical members.
FIG. 4 is a view showing an arrangement for closing the open connecting ring with three suspended vertical members.

A connecting ring 2 composed of round steel and having a substantially circular cross section is shown in FIG. 3 as provided with three vertical members 3 suspended therein. The connecting ring 2 is in its open condition. It is to be understood that an opening 6 which is formed by the leg-like radially outwardly bent ring ends 4 has such a dimension as to allow convenient suspension of the vertical members 3. Inner sides 7 of the legs 4, which face towards one another, are formed flat so that in the closed condition of the connecting ring 2 they abut directly against one another.

The arrangement shown in FIG. 3 is introduced into an arrangement schematically shown in FIG. 4 for bending and pressing both legs 4. The arrangement shown in FIG. 4 has a counter-support 8 and two bending or pressing pins 9 corresponding to the connecting ring 2 and one vertical member 3. The connecting ring 2 is compressed respectively in the region between one vertical member 3 and one leg 4 by the pins 9 in direction of the arrow P, so that the inner surfaces 7 of the legs 4 come to abutment against one another.

Figure 5:
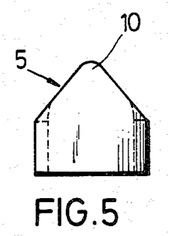
FIGS. 5–7 are views showing a closure sleeve in end, side and plan views, to be fitted onto ends of the connecting ring shown in FIGS. 1–4, 8, 15–19, 22–26 and 32.
Figure 6:
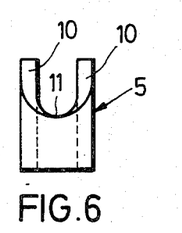
Figure 7:
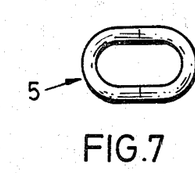

When the surfaces 7 abut against one another, the closure sleeve 5 shown in FIGS. 5-7 is fitted onto the legs 4. It then assumes the configuration shown in FIG. 8. As can be seen from FIG. 7, the closure sleeve 5 has an oval cross section which can receive both legs 4 with a small play. The closure sleeve 5 has in its upper region at each wide side a holding tongue 10. Both holding tongues 10 are bent against one another as will be described hereinbelow, so as to prevent pulling of the closure sleeves 5 from the connecting ring 2 and moreover to provide that one or another leg 4 is not pulled out of the closure sleeve 5 when the connecting ring 2 is subjected to strong pulling stresses. The region 11 between the holding tongues correspond with respective curvature to the outer contour of the connecting ring 2.

Figure 8:
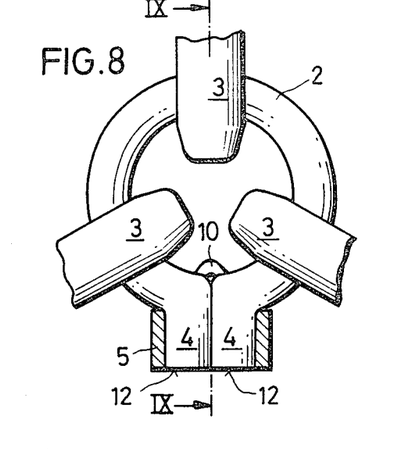
FIG. 8 is a view showing a finished connecting ring with three vertical members with the closure sleeve in section.
Figure 9:
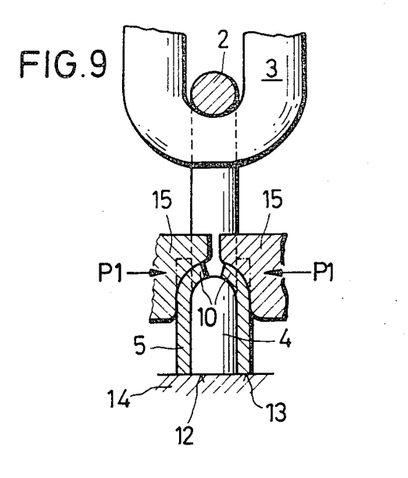
FIG. 9 is a view showing a section of FIG. 8 taken along the line IX—IX with an arrangement for bending holding tongues of the closure sleeve.
Figure 10:
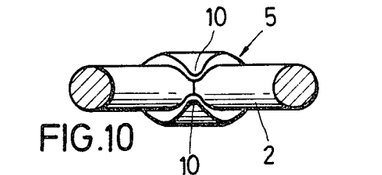
FIG. 10 is a view showing the closure sleeve which holds together the ends of one connecting ring as seen from inside.
Figure 11:
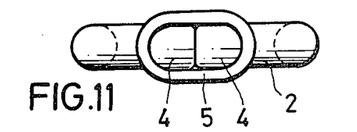
FIG. 11 is a view on the end side of the legs and showing the connecting ring closed by the closure sleeve.

FIG. 8 shows a connecting ring 2 with the vertical members 3 suspended thereon in closed condition. The legs 4 are held together by the closure sleeve 5 and the holding tongues 10 are bent to holding projections. Bending of the holding tongues 10 is illustrated in FIG. 9. The connecting ring 2 stands with end surfaces 12 of the legs 4 and end surfaces 13 of the closure sleeve 5 on a base 14. Tool bending dies 15 act in direction of the arrow P1 upon the outer surfaces of the holding tongues 10 to bend them, so that the holding tongues 10 with their inner surfaces come to conformity with the outer contour of the connecting ring 2 as shown in FIG. 10.

Figure 12:
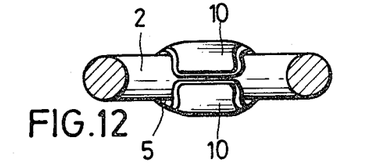
FIG. 12 is a view essentially corresponding to the view of FIG. 10, but showing the closure sleeve with wide holding tongue.

FIG. 12 shows an embodiment which somewhat differs from the above described embodiment. The distinctive feature shown in FIG. 12 is that the holding tongues 10 are not triangular as in the preceding embodiments, but instead are trapezoidal. Because of the shape of the holding tongues 10 an improved seating of the closure sleeve 5 on the closure ring 2 is guaranteed.

Figure 13:
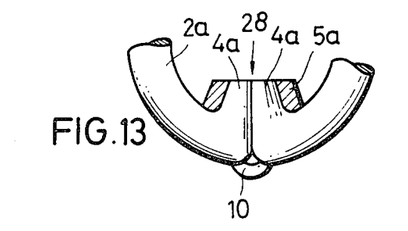
FIG. 13 is a view showing a connecting ring in the region of the abutment of the legs with radially inwardly bent legs and a closure sleeve in section.
Figure 14:
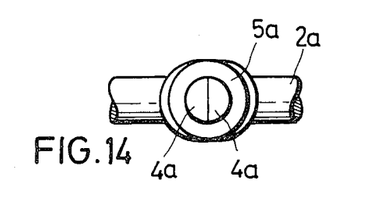
FIG. 14 is a view on the end side of the legs and closure sleeve of FIG. 13 from the interior of the ring.

In the embodiment shown in FIGS. 13 and 14, legs 4a of the connecting ring 2a are bent radially inwardly. The assembly of the connecting ring 2a with the not shown vertical members 3 is performed analogously to the above described embodiments, so that any further detailed explanation thereof would be superfluous. The legs 4a are formed wedge-shaped at their sides facing away from one another. In the region of the leg thrust location 28, they abut flatly against one another. A closure sleeve 5a is designed in correspondence with the contour of the legs 4a. The holding tongues 10 again serve for the position securing of the legs 4a.

Figure 15:
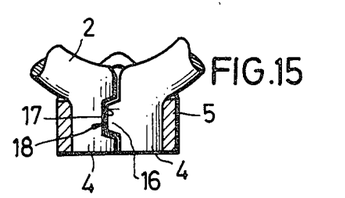
FIGS. 15-18 are views showing several embodiments of connecting rings whose legs are toothed in groove-like or spline-like manner in a plan view with a closure sleeve in section.
Figure 16:
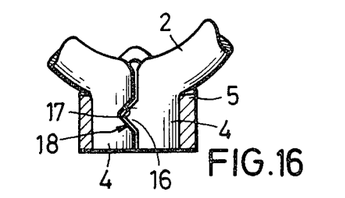
Figure 17:
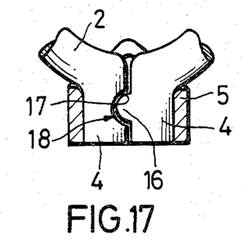
Figure 18:
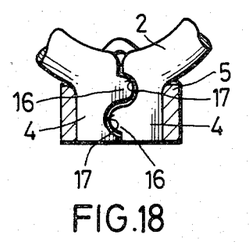

FIGS. 15–18 show embodiments in which the legs 4 of the connecting ring 2 are toothed in groove-like or spline-like manner. A projection 16 provided in one leg 4 form-lockingly engages in a respectively designed recess 17 on the other leg 4. Separation joints 18 extend without exception normally to the plane of the drawing. The cross section of the grooves 17 and the projections 16 in the embodiment shown in FIG. 15 is somewhat trapezoidal, whereas the cross section of the same in FIG. 16 is somewhat triangular, the cross section of the same in the embodiment of FIG. 17 is somewhat semicircular, and the cross section of the double arrangement of FIG. 18 is also somewhat semicircular.

Figure 19:
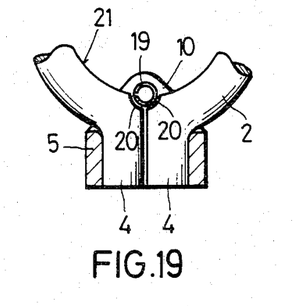
FIG. 19 is a plan view of a connecting ring in the region of the abutment of the legs with a closure sleeve in section.

FIG. 19 shows an embodiment in which both radially outwardly bent legs 4 of one connecting ring 2 is held by the closure sleeve 5 through which a clamping sleeve 19 extends. The clamping sleeve 19 also abuts in a peripheral region of approximately 90° against the inner side of a recess 20 in the transition from an inner periphery 21 of the connecting ring 2 to the legs 4.

Figure 20:
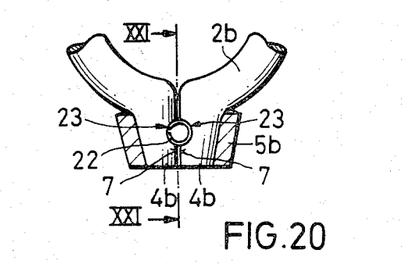
FIG. 20 is a further embodiment of a connecting ring in plan view in the region of the abutment of the legs with a closure sleeve in section.
Figure 21:
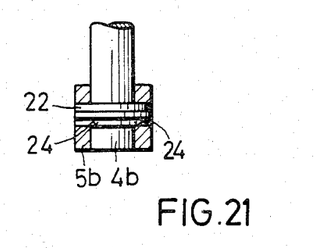
FIG. 21 is a view showing a vertical section of the connecting ring of FIG. 20, taken along the line XXI—XXI.

In the embodiment of FIGS. 20 and 21, a clamping sleeve 22 extends both through both wedge-shaped legs 4b of one connecting ring 2b, and also through a closure sleeve 5b which holds together the legs 4b. The clamping sleeve 22 in its central region lies in two semicylindrical recesses 23 inside the inner surfaces of the legs 4b, whereas the clamping sleeve 22 engages with its outer portions in openings 24 of the clamping sleeve 5b as shown in FIG. 21.

Figure 22:
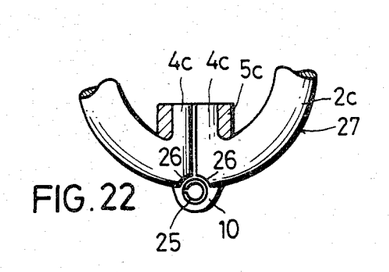
FIG. 22 is a view showing a further embodiment of a connecting ring in plan view in the region of the abutment of the legs with a closure ring in section.

FIG. 22 shows a connecting ring 2c whose radially inwardly bent legs 4c are held together by a closure sleeve 5c with holding tongues 10 through which a clamping sleeve 25 extends. The clamping sleeve 25 lies with a part of its outer surface in recesses 26 at the transition from an outer periphery 27 of the connecting ring 2c to the legs 4c. This embodiment is opposite to the embodiment of FIG. 19.

Figure 23:
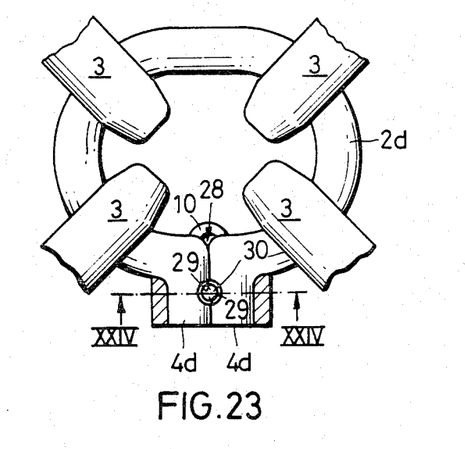
FIG. 23 is a view showing an oval connecting ring which is held by a closure sleeve and carries four vertical members in plan view and a closure sleeve in section.

FIG. 23 shows a connecting ring 2d which is oval on a plan view and provided with four suspended vertical members 3. Legs 4d of the connecting ring 2d are held together by a closure sleeve 5d with holding tongues 10 which are bent inwardly in the region of the leg thrust location 28 for formation of holding projections. The legs 4d have at their oppositely located inner sides a semicylindrical recess 29 which forms in the bent condition of the legs 4d a recess 30 for a safety pin 30. The closure sleeve 5d not only holds both legs 4d together, but also prevents falling out of the safety pin 30.

Figure 24:
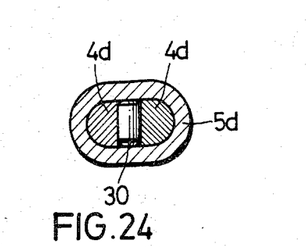
FIG. 24 is a view showing a section taken along the line XXIV—XXIV in FIG. 23.
Figure 25:
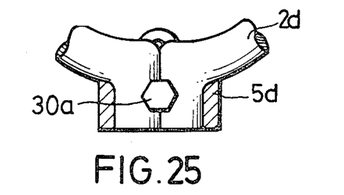
FIGS. 25 and 26 are views showing two further embodiments of a connecting ring in plan view in the region of the abutment of the legs with the closure sleeve in section.
Figure 26:
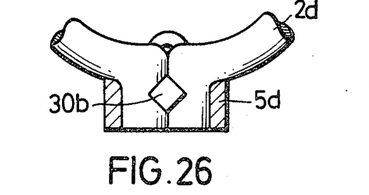

FIGS. 25 and 26 show different embodiments in accordance with which safety pins 30a and 30b, in contrast to the embodiment of FIGS. 23 and 24, have a hexagonal or quadrangular cross section.

Figure 27:
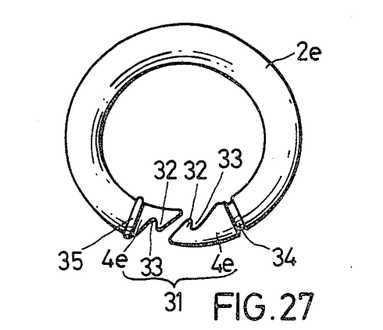
FIG. 27 is a plan view of a connecting ring which has ends engaging with one another in a circumferential direction.
Figure 28:
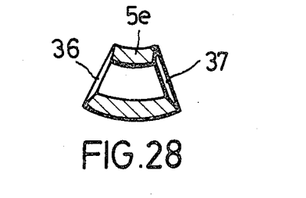
FIG. 28 is a view showing a longitudinal section of a curved closure sleeve for the connecting ring of FIG. 27.
Figure 29:
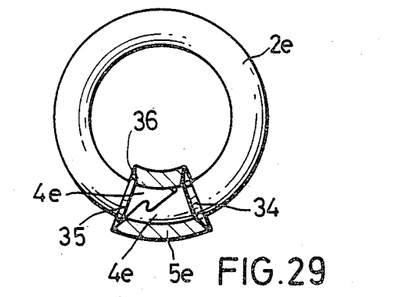
FIG. 29 is a plan view of the connecting ring of FIG. 27 with the fitted curved closure sleeve in longitudinal section.

In the above described embodiments, the connecting rings 2–2d have radially outwardly or radially inwardly bent legs 4–4d. The embodiments shown in FIGS. 27–29 provide for a connecting ring 2e with ends 4e extending in a circumferential direction. As can be seen from FIG. 27, the connecting ring 2e in the region of a suspending location 31 has two substantially congruent or mirror-symmetrically designed ring ends 4e each provided with an arresting projection 32. The arresting projection 32 engage respectively in arresting recesses 33 formed on the other ring end 4e when the connecting ring 2e is compressed. An annular groove 34 or an annular bead 35 are provided on the ring ends 4e.

For assembly of the tire and antiskid net 1 or 1a having such a connecting ring 2e, first the not shown vertical members 3 are suspended in the required number in the connecting ring 2e, and then the right end 4e of the connecting ring 2e in FIG. 27 is introduced into the curved closure sleeve 5e shown in FIG. 28. Now the compression of the connecting ring 2e takes place, so that the arresting projections 32 engage with the arresting recesses 33, whereby the engaging parts are now under a pulling tension of the connecting ring 2e composed of hardened and wear-resistant spring steel. For preventing opening of the connecting ring 2e, particularly by lateral displacement (out of the plane of the drawing) of the ring end 4e, the closure sleeve 5e after engagement is displaced over the suspending location 31 until it comes with its end side 36 to abutment against the annular bead 35. A not shown safety ring spring can be introduced into the annular groove 34 to avoid displacement of the closure sleeve 5e to the right. The closure sleeve 5e arrives then with its end side 37 to contact with the safety ring spring. As can be seen from FIG. 29, the transition location between both ring ends 4e has a zig-zag shape or course.

For forming the inlet opening 6 for the vertical members 3, it is not necessary to have the opposite legs 4–4e always spreading apart as shown in the above described embodiment. Instead, it is possible to arrange legs 4f so that they are offset opposite to one another from the ring plane, as shown for a connecting ring 2f illustrated in FIGS. 30 and 31.

Figure 30:
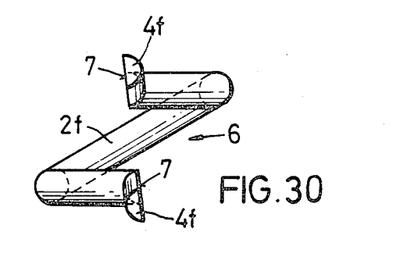
FIG. 30 is an end view of a connecting ring with radially outwardly bent legs which are offset from the central plane of the connecting ring.
Figure 31:
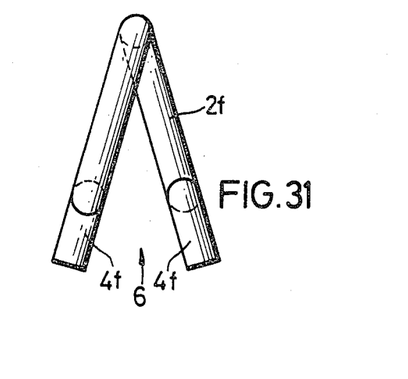
FIG. 31 is a side view of the connecting ring of FIG. 30.
Figure 32:
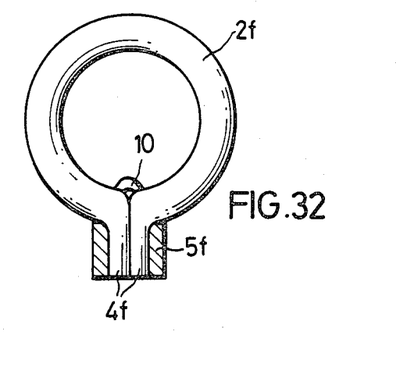
FIG. 32 is a plan view of the connecting ring of FIG. 30 which is closed by a closure sleeve in section.

Both legs 4f provided with flattened inner sides 7 have a distance from one another which makes possible an easy introduction of the vertical members 3. The inlet opening can also be formed so that the legs 4f are not only offset relative to one another, but in addition can be spread apart from one another as in the above described embodiments, whereby a somewhat diagonal inlet opening 6 is formed. After suspension of the vertical members 3, the connecting ring 2f is bent so that it lies in one plane and the legs 4f are surrounded by the closure sleeve 5f, as shown in FIG. 32.

The closure of the above described connecting rings 2–2f can be performed also with the aid of a simple tongs-like squeezing tool, so that the connecting members 2–2f with the closure sleeve 5–5f can be used in situ, for example as repair members. Also, shrinking of the closure sleeves 5–5f is recommended.

It will be understood that each of the elements described above, or two or more together, may also find a useful application in other types of constructions differing from the types described above.

While the invention has been illustrated and described as embodied in a tire and antiskid net for vehicle tires, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential features of the generic or specific aspects of this invention.

What is claimed as new and desired to be protected by Letters Patent is set forth in the appended claims.

I claim:

1. A tire and antiskid chain for vehicle tires, particularly for tires of heavy earth moving machines, comprising a plurality of vertical members to be arranged substantially normal to a tire surface; a plurality of connecting rings of a limited length and arranged to extend substantially parallel to the tire surface and to engage said vertical members, said connecting rings being composed of a spring steel hardened to a required wear-resistance, each of said connecting rings having a ring part and two end legs abutting against one another, said end legs of each of said connecting rings having sides which abut against one another and are flat; and a plurality of closure sleeves each arranged to hold together the end legs of a respective one of said connecting rings, each of said closure sleeves being in a fitted on position on a respective one of said connecting rings and overlapping on the latter said two end and also overlapping said ring apart in its end portiosn adjoining said end legs.

2. A tire and antiskid net as defined in claim 1, wherein said legs of each of said connecting rings are bent radially outwardly.

3. A tire as defined in claim 1, wherein each of said closure sleeves have two tongues which outwardly overlap a respective one of said connecting rings and are fixable in the region of abutment of said legs against one another.

4. A tire as defined in claim 3, wherein each of said connecting rings has a ring central plane, said tongues of each of said closure sleeves being bent in direction of the ring central plane with support on the respective connecting ring.

5. A tire and antiskid net as defined in claim 3; and further comprising a plurality of clamping pins each extending through the holding tongues of a respective one of said closure sleeves.

6. A tire and antiskid net as defined in claim 1, wherein the legs of each of said connecting rings have a recess and a projection form-lockingly engaging in said recess, respectively, each of said connecting rings having a ring central plane, and said projection and said recess of said legs of each of said connecting rings having a separating joint extending normal to the ring central plane of a respective one of said connecting rings.

7. A tire and antiskid net as defined in claim 1, wherein said legs of each of said connecting rings have at said sides abutting against one another symmetrical recesses; and further comprising a plurality of members insertable into the recesses of said legs of each of said connecting rings.

8. A tire and antiskid net as defined in claim 7, wherein said members insertable into said recesses of said legs of each of said connecting rings are clamping sleeves.

9. A tire and antiskid net as defined in claim 7, wherein each of said members insertable into said recesses of said legs of each of said connecting rings is a safety pin.

10. A tire and antiskid net as defined in claim 7, wherein said legs of each of said connecting rings have a predetermined thickness, each of said members insertable into the recess of said legs of a respective one of said connecting rings having a length corresponding to the thickness of said legs of the same connecting ring.

11. A tire and antiskid net as defined in claim 7, wherein each of said members located in the recesses of said legs of each of said connecting rings extends through a respective one of said closure sleeves.

12. A tire and antiskid net as defined in claim 1, wherein said legs of each of said connecting rings extend in a circumferential direction and mirror-symmetrically engage in one another in an engagement region, each of said closure sleeves being formed as a sleeve fitted over said legs in said engagement region and having a curvature corresponding to the curvature of said connecting ring in said region.

13. A tire and antiskid chain for vehicle tires, particularly of tires of heavy earth moving machines, comprising a plurality of vertical members to be arranged substantially normal to a tire surface; a plurality of connecting rings of a limited length and arranged to extend substantially parallel to the tire surface and to engage said vertical members, each of said connecting rings having two end legs abutting against one another, said legs of each of said connecting ring extend in a circumferential direction and mirror-symmetrically engage in one another in an engagement region wherein one of said legs has an arresting projection which engages in an arresting recess of the other said leg; a plurality of closure sleeves each arranged to hold together the end legs of a respective one of said connecting rings, each of said closure sleeves being fitted over said end legs in said engagement region and having a curvature corresponding to the curvature of said connecting rings in said region; and means for securing the position of each of said closure sleeves, said securing means including an annular bead provided on one end and a clamping ring provided on the other end of each of said connecting rings.

* * * * *